Nov. 15, 1966 P. W. COUP 3,285,652
BERTH WITH SPRING SUSPENSION

Filed May 3, 1965 8 Sheets-Sheet 1

INVENTOR.
PAUL W. COUP

BY
ATTORNEY

Nov. 15, 1966 P. W. COUP 3,285,652
BERTH WITH SPRING SUSPENSION

Filed May 3, 1965 8 Sheets-Sheet 2

INVENTOR.
PAUL W. COUP
BY
ATTORNEY

Nov. 15, 1966 P. W. COUP 3,285,652
BERTH WITH SPRING SUSPENSION
Filed May 3, 1965 8 Sheets-Sheet 3

INVENTOR.
PAUL W. COUP
BY
ATTORNEY

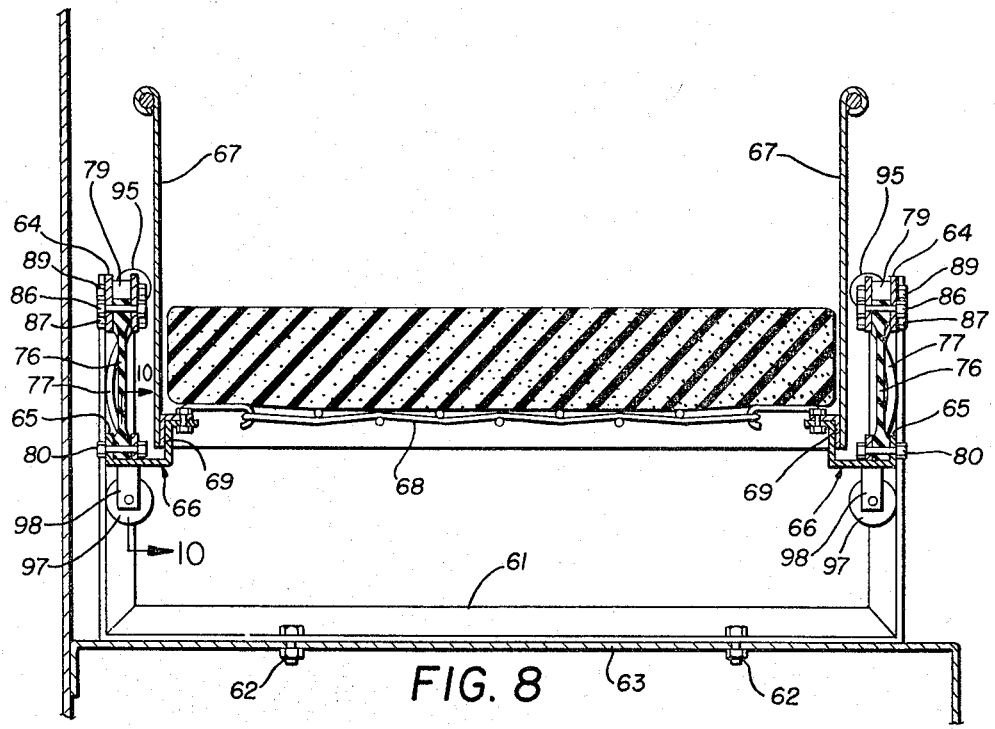
FIG. 8
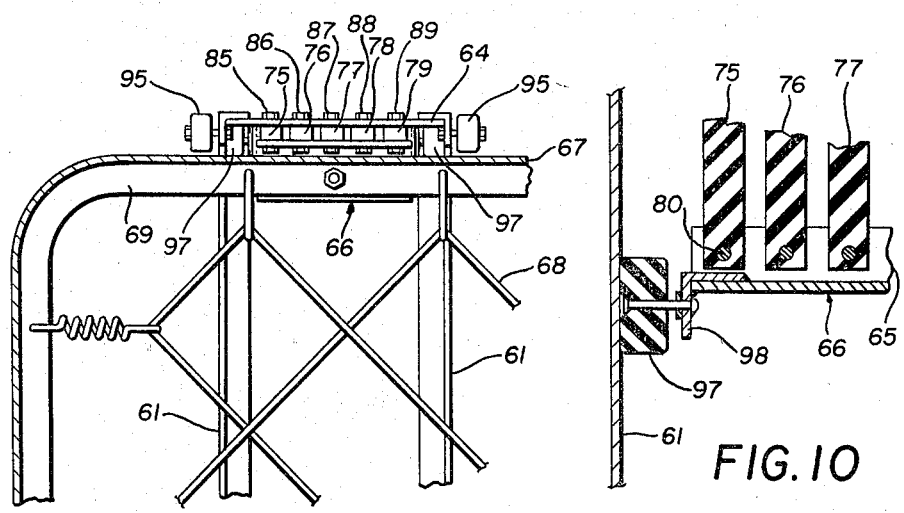
FIG. 9
FIG. 10
INVENTOR.
PAUL W. COUP

Nov. 15, 1966  P. W. COUP  3,285,652
BERTH WITH SPRING SUSPENSION
Filed May 3, 1965  8 Sheets-Sheet 5

INVENTOR.
PAUL W. COUP
BY
ATTORNEY

INVENTOR.
PAUL W. COUP

Nov. 15, 1966 P. W. COUP 3,285,652
BERTH WITH SPRING SUSPENSION
Filed May 3, 1965 8 Sheets-Sheet 7

INVENTOR.
PAUL W. COUP
BY
ATTORNEY

Nov. 15, 1966    P. W. COUP    3,285,652
BERTH WITH SPRING SUSPENSION
Filed May 3, 1965    8 Sheets-Sheet 8

INVENTOR.
PAUL W. COUP
BY
ATTORNEY

United States Patent Office 3,285,652
Patented Nov. 15, 1966

3,285,652
BERTH WITH SPRING SUSPENSION
Paul W. Coup, Akron, Ohio, assignor of one-half to Floyd M. Snyder, Akron, Ohio
Filed May 3, 1965, Ser. No. 452,676
1 Claim. (Cl. 296—24)

This application is a continuation-in-part of my application Serial No. 125,036 filed July 14, 1961, now U.S. Patent No. 3,231,304, which in turn is a continuation-in-part of my application Serial No. 56,177 filed September 15, 1960.

This invention relates to a berth designed particularly for a sleeper cab, to be located behind the driver's seat in the cab of either a tractor, a combination tractor and trailer, or other truck. It may be used elsewhere, as on a train or ship.

Ordinarily a berth comprises box-like sides and a pallet on which a person sleeps. In a sleeper cab, the pallet is usually a flat board without any sort of spring support. The berth is positioned across the cab with the head at one side of the cab and the foot at the other side. Ordinarily there is a mattress on the pallet.

The invention relates to a resilient support for the pallet which cooperates with vertical guide means to absorb the momentum of the forward movement of the pallet when the truck is brought to a sudden stop. Usually, rollers will be provided to roll against the guide means, although slides may be used. The guide means, etc. may be located at the front and back of the berth, or at its ends.

According to this invention, the forward edge of the pallet is resiliently supported and dips forward when the berth carries a load which is shiftable longitudinally of the truck when there is a sharp decrease in its forward movement. Stop means limits the forward swaying of the pallet and the forward momentum is dissipated, at least partially, by the resilient support of the pallet which counteracts the downward dip.

The invention will be further described in connection with the accompanying drawings, in which:

FIGURE 8 is a sectional view on the line 8—8 of FIGURE 6;

FIGURE 9 is a plan view on the line 9—9 of FIGURE 6;

FIGURE 10 is a view on the line 10—10 of FIGURE 8;

Figure 1:
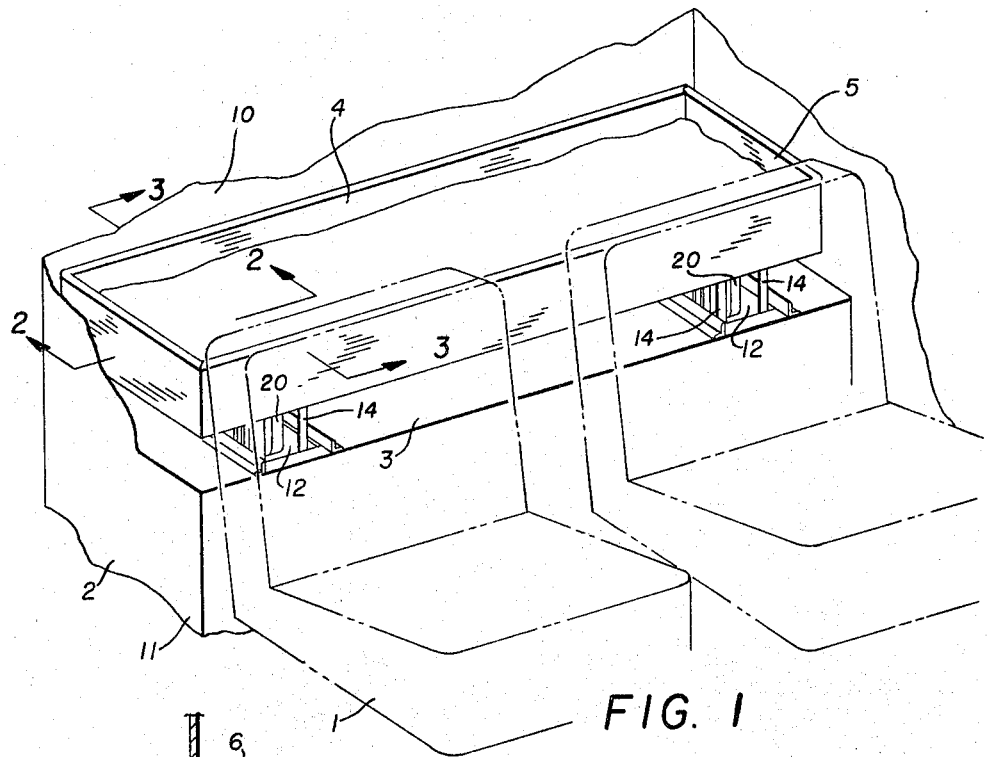
FIGURE 1 is a view in perspective of a berth located behind the seat in a cab of a truck, tractor or trailer, in which the support for the berth is located below the berth and at its sides.
Figure 2:
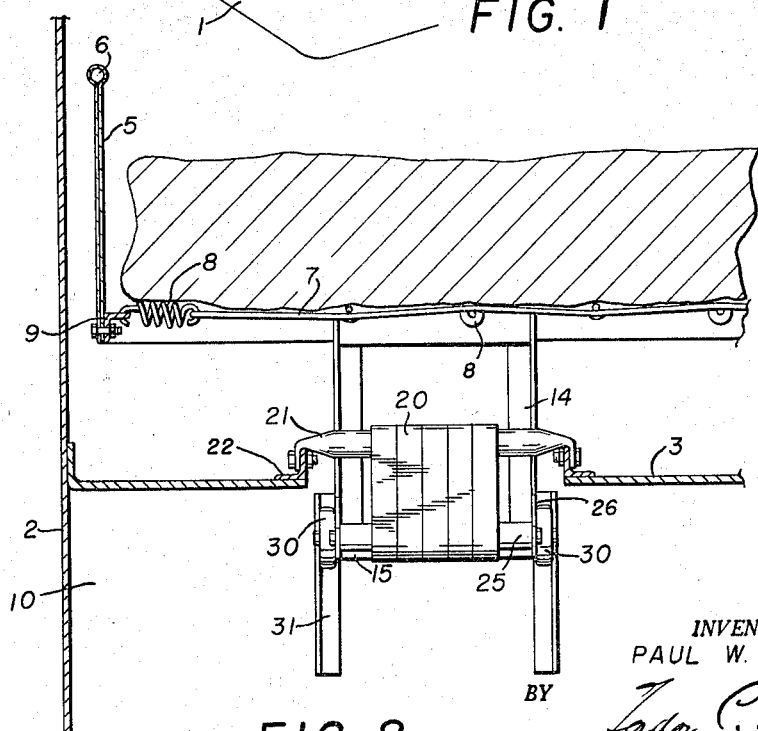
FIGURE 2 is a section on the line 2—2 of FIGURE 1 showing one end of the pallet and the guide means with a rubber band suspension.
Figure 3:
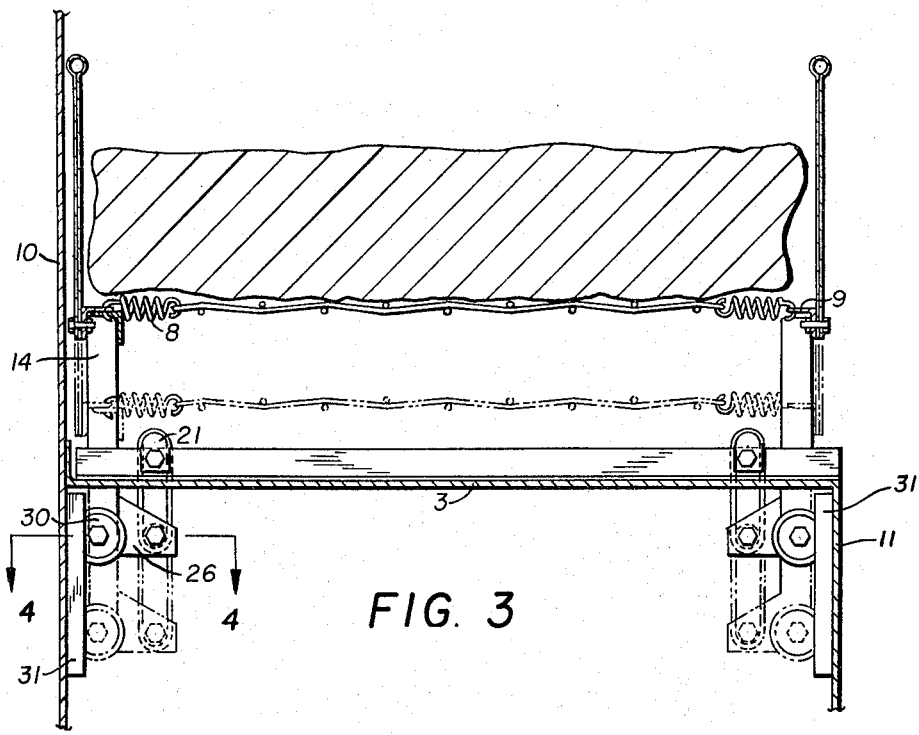
FIGURE 3 is a section on the line 3—3 of FIGURE 1 showing a different view of the same; the position of the elements with the rubber suspension contracted being shown in full lines, and their position with the rubber suspension extended being shown in dot-dash lines.

Although the details of a cab construction vary, they are generally the same in that behind the seat or seats 1 there is a frame 2 with a top or cover surface 3 above which is the berth 4. Usually the berth rests on the surface 3. In this case the driver depends solely upon the mattress of the berth to absorb the jolts of the ride. In the structure of FIGURES 1 to 5 the berth 4 is supported above the surface 3. The box-like sides 5 of the berth are preferably formed of sheet metal which may be a double sheet rounded at the top 6. The pallet 7 is composed of interwoven narrow steel straps running longitudinally and small rods running transversely. The straps are supported at their ends by coil springs 8 attached to the angle iron frame 9.

The cover surface 3 extends from the back wall 10 of the cab to the wall 11 in back of the seats. There are rectangular openings 12 in the surface 3 under both edges of both the head and the foot of the pallet. The guides located in these openings are advantageously formed of angle irons 14 fastened to the border 9 of the pallet, and they extend vertically downwardly therefrom. They are spaced at the bottom by the transverse angle iron 15.

In FIGURES 1-4 the pallet is supported by rubber bands 20. These are each located around a bar 21 supported by angle irons 22 welded or otherwise fastened to the cover surface 3, and a bar 25 supported in brackets 26 welded to the upright angle irons 14. Near the bottom of each pair of angle irons 14 are rollers 30 which roll up and down in the angle iron guides 31 fastened to the walls 10 and 11.

As the truck comes to a sudden stop, and a driver on the pallet rolls forward, the forward edge of the pallet dips and the force of the forward momentum of the pallet is dissipated by those rollers 30 which are attached to the forward edge of the pallet, rolling against those guides 31 which are located directly in front of them.

Figures 4, 5:
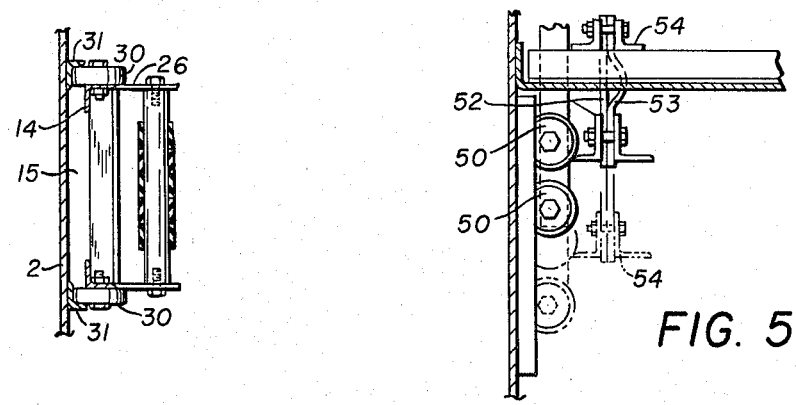
FIGURE 4 is a plan view on the line 4—4 of FIGURE 3.
FIGURE 5 shows an alternative construction.

In the embodiment shown in FIGURE 5, two rollers 50 replace each roller 30. The use of two rollers in this manner gives greater stability than a single roller. Two rubber straps 52 and 53 are used for support at each corner of the pallet. The shorter strap 52 is adequate to support a lighter person, and when a heavier person occupies the berth, this strap 52 is stretched until strap 53 carries part of the load. The ends of the straps are shown as held between angle irons 54, but any suitable means for anchoring the ends of the straps can be used.

The berth 60 of FIGURES 6–10 is suspended from angle-iron supports 61 which are bolted by bolts 62 to the cover surface 63 of the cab. The supports are arranged in pairs at the front and back of the berth, near its head and foot. The plate 64 is welded to support 61 of each pair. The berth is different from that shown in FIGURES 1–3 in detail only. The side 67 is single ply and the spring bottom is formed from wires 68. This spring is supported from the angle-iron rim 69 to which the side 67 is welded or bolted, and this rim is held by the four brackets 66.

Figure 6:
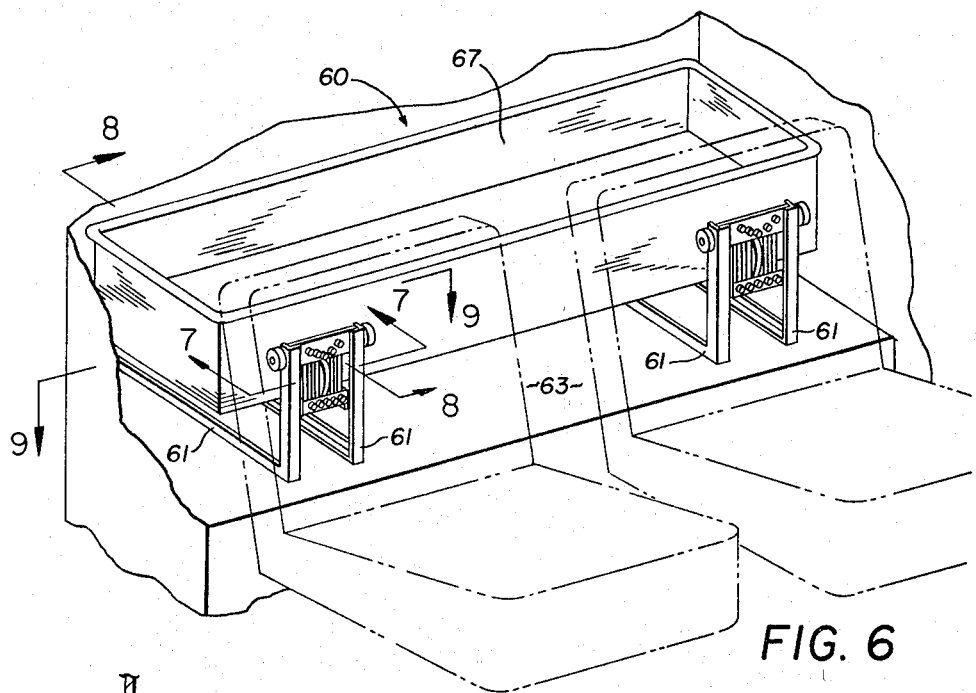
FIGURE 6 shows a view in perspective of a berth located behind the driver's seat, but showing an alternative structure in which the berth is suspended from supports at its sides.
Figure 7:
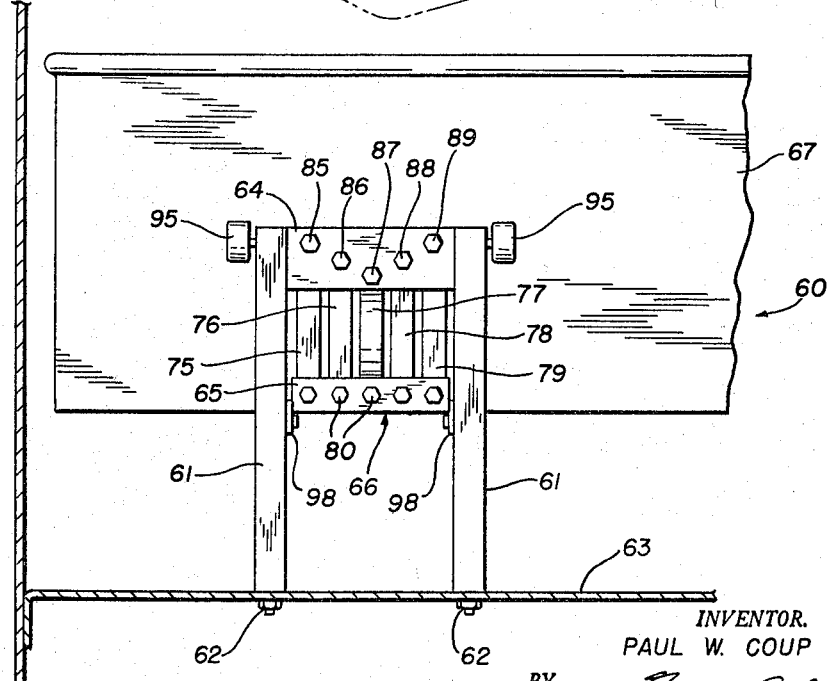
FIGURE 7 is a view on the line 7—7 of FIGURE 6.
Figure 11:
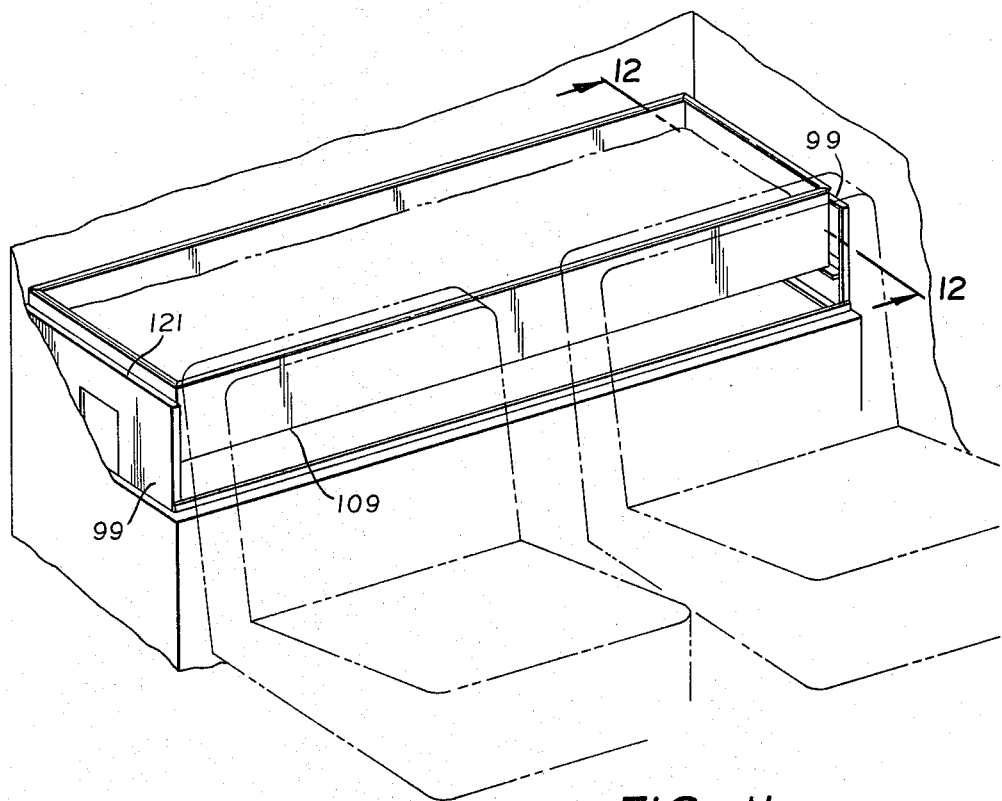
FIGURE 11 is a front perspective view of a still different embodiment of the invention.
Figure 15:
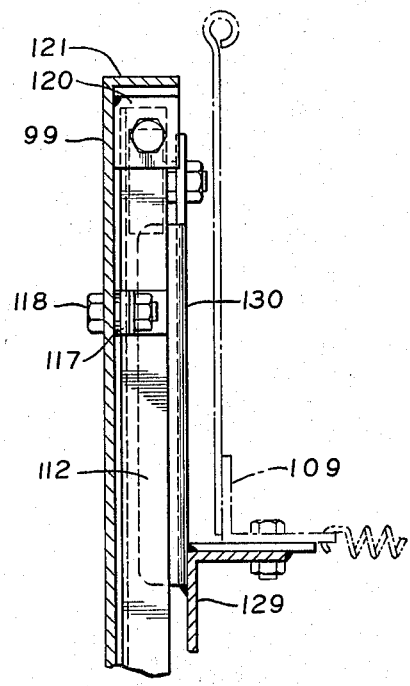
FIGURE 15 is a vertical section on the line 15—15 of FIGURE 12.
Figure 12:
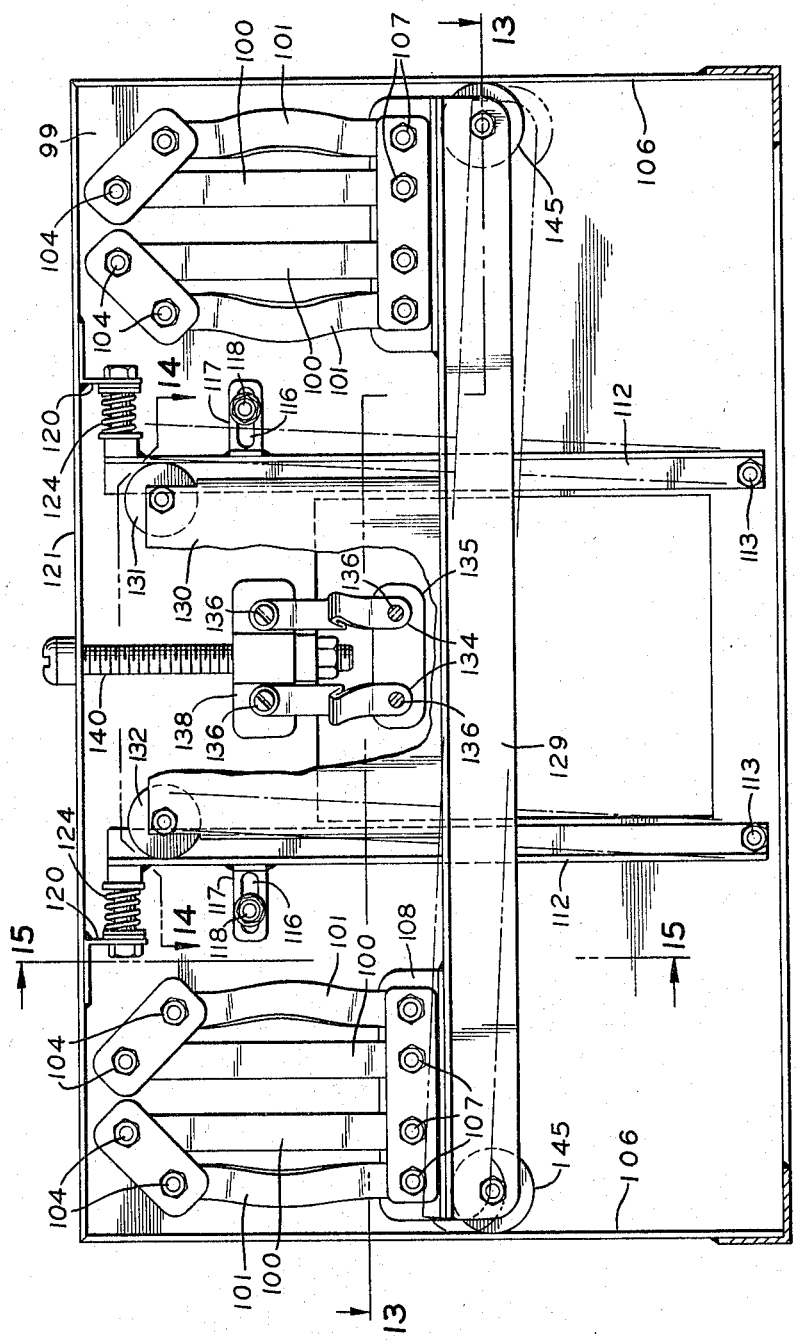
FIGURE 12 is a vertical section on the line 12—12 of FIGURE 11.
Figure 13:
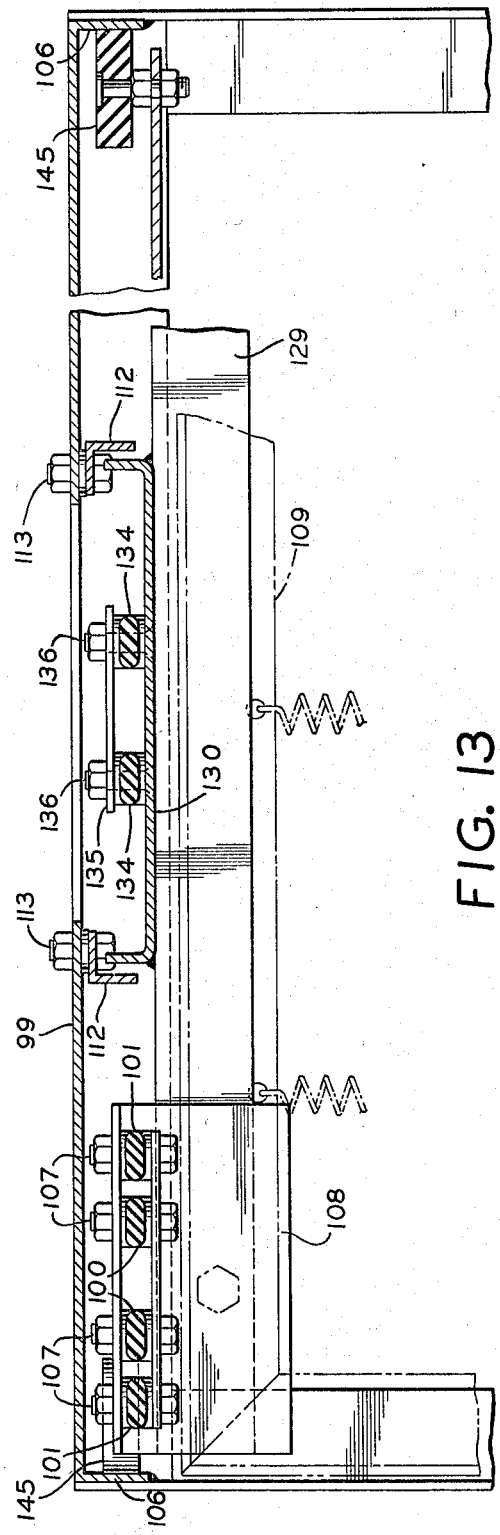
FIGURE 13 is an enlarged horizontal section on the line 13—13 of FIGURE 12.
Figure 14:
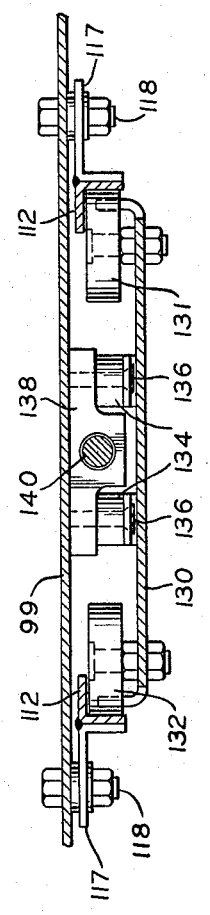
FIGURE 14 is a horizontal section, on the same enlarged scale, on the line 14—14 of FIGURE 12.

The berth is supported by five rubber members 75, 76, 77, 78 and 79 referred to herein as "dog bones," because they are molded members which comprise a knob at each end attached to a shank or strap-like portion. Each knob has a hole through it. The bolts 80 pass through the bottom holes. The bolts 85, 86, 87, 88 and 89 pass through the upper holes. The dog bones are all of the same length, but the upper bolts are arranged as an inverted V (FIGURE 7). When no one is in the berth, the load is carried by the outside dog bones 75 and 79. When someone is in the berth the load is carried by these dog bones and dog bones 76 and 78. When the berth carries a heavy load or is subjected to strain as by the vehicle coming to a sudden stop, the center dog bone 77 shares the load. The center dog bone 77 is shown in FIGURE 6 as bowed and carrying none of the load. The berth is empty, so dog bones 75 and 79 are carrying the load, and dog bones 76 and 78 are extended without carrying any load. The bolts 80 clamp the dog bones between the turned-up end 65 of bracket 66 and the plate 90. The bolts 85 to 89 clamp the dog bones between plates 64 and 92.

The upper rollers 95 are supported by the angle irons 61. These rollers are preferably located a short distance from the sides 67 of the berth so as to give the berth a little play. The lower rollers 97 are supported by brackets 98 welded to the brackets 66, and they ride against angle irons 61. The angle irons restrict both longitudinal and lateral sway of the berth.

Figure 16:
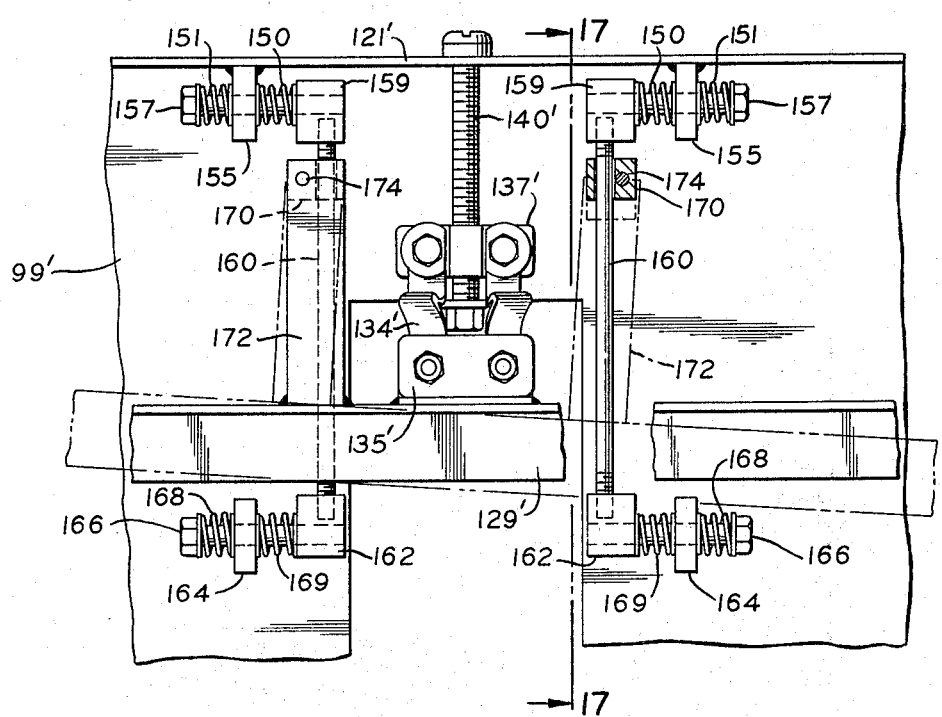
FIGURE 16 is an elevational detail on the same enlarged scale of a still different modification.
Figure 17:
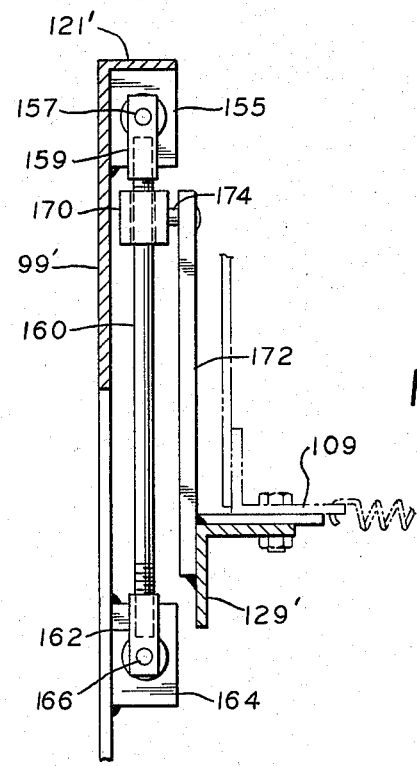
FIGURE 17 is a vertical section on the line 17—17 of FIGURE 16.

In the modification shown in FIGURES 11–15, and also that of FIGURES 16–17, rubber straps are used for support of the berth. In each of these modifications, the berth is supported in a frame which is fastened to the floor of the cab. The berth is supported from the ends 99 of this frame. At each side there are four rubbers 100 and 101. The center rubbers 100 (FIGURE 12) carry the load when the berth is empty, and the outside rubbers 101 become taut and help to carry the load when there is a person in the berth. The two rubbers 134 at the middle of each end are described below. The tops of the rubbers 100 and 101 are bolted at 104 to the ends 99 of the frame (FIGURE 13), and the bottoms are bolted at 107 to the angle 108 which is fastened to the angle iron which supports the pallet 109.

The angled guides 112 (FIGURE 12) are pivoted at their bottoms 113 to the ends of the frame 99. The slots 116 in the extensions 117 of these guides embrace bolts 118, permitting the guides to move from one side to the other as permitted by these slots. The brackets 120 are welded to the flange 121 along the top of the frame 99. The tops of the guides can move one way or the other against the tensioned springs 124 which are between the tops of these guides and these brackets. Thus the guides can tip to one side or the other about pivots 113 against the springs 124.

The plate 130 is supported by the angle 129 to which the pallet supports 108 are attached. Rubber rollers 131 and 132 attached to the plate 130 roll against the guides 112 as the pallet is depressed or raised. This plate 130, when under a load, is supported by the rubber straps 134 which are attached to the plate 130 through bracket 135 at their bottoms by bolts 136 and fastened at their tops to the plate 138 which is supported from the flange 121 by screw 140, at any desired height. These straps assist in supporting the pallet, and the screw 140 is turned to adjust the amount of the load carried by these straps. Rollers 145 at the ends of the angle 129 ride up and down against vertical flanges 106 at the edges of the frame 99.

When a driver is asleep on the berth and the truck comes to a sudden stop, the pallet which is supported by angles 108 lowers, the rubbers 100, 101 and 134 are tightened, and the front roller 131 rolls down against the forward guide 112. Thus, the forward momentum is largely dissipated or absorbed by the rubber supports 100, 101 and 134. There is no sudden shock. As the truck comes to a stop the pallet levels off (except for any imbalance caused by the position of the sleeper).

In FIGURES 16–17, there is no plate such as the plate 130 of FIGURES 11–15. Bracket 135' is fastened directly to the angle 129'. There are rollers (not shown) identical with rollers 145 of FIGURES 11–15 at the ends of the angle 129' which ride up and down on vertical flanges of the frame 99'. There are no rollers which perform the function of rollers 131 and 132.

Instead of the single spring 124 (FIGURES 11–15) there are two springs 150 and 151 on opposite sides of the screw 140', etc. Brackets 155 are welded to the flange 121' of frame 99'. There is a hole in each bracket through which the screw 157 extends, and this is threaded into a hole tapped into the block 159. The springs are supported around screw 157. On each side of the berth a rod 160 extends from block 159 to block 162. Bracket 164 is welded to the frame 99'. Screw 166 extends through an opening in bracket 164 into a tapped hole in block 162, and the springs 168 and 169 surround the screw 166. Thus the rods 160 can be tilted to one side or the other, at the top and bottom, against the pressure of the springs.

Each rod 160 extends through another block 170 which is free to slide on the rod. The angle 129' is supported from the blocks 170 by elongated supports 172 which at the top are pivoted at 174 to the blocks 170.

When the truck comes to a sudden stop, a person sleeping on the pallet is thrown forward. This lowers the front of the pallet, and as in FIGURES 11–15, the front roller 145 rolls down against flange 106. The front of the angle 129' dips down. The tops of the supports 172 slant forward and the front blocks 170 slide down on the rods 160. Simultaneously, front springs 150 and 169 are compressed. Rear springs 151 and 168 are compressed. The momentum of the forward movement is thus resiliently absorbed by these springs as the pallet tips forward, and the springs limit the amount the pallet can tip.

Although the absorption of the forward momentum has been emphasized, it can readily be seen that the rubber straps absorb up and down irregularities in the road bed, and the means which supports the pallet from the frame absorbs the shock of sudden starting as well as sudden stopping.

The invention is covered in the claim which follows.

What I claim is:

In combination with the cab of a truck, the pallet of a berth inside of the cab and fastened thereto with its head toward one side of the cab and its foot toward the other side, the pallet being stiff and flat so that an occupant positioned near the longitudinal center thereof is moved forward on the pallet when the cab comes to a sudden stop, the pallet being resiliently supported for vertical movement and slight horizontal movement, there being two elements in the combination which cooperate to absorb some of the horizontal movement of the pallet when the pallet is occupied and the truck comes to a sudden stop and the occupant is moved to the forward edge of the pallet by the sudden stopping of the truck and the forward edge of the pallet is directed downwardly against the resilient support of the pallet, tipping the pallet forward, one of said two elements being secured to move with the pallet and the other being secured to move with the cab, one of said elements forming a substantially vertical guide and the other forming means for cooperating with the guide to direct the forward edge of the pallet down as aforesaid.

References Cited by the Examiner

UNITED STATES PATENTS

| | | | |
|---|---|---|---|
| 359,388 | 3/1887 | Hauser et al. | 5—210 X |
| 3,067,437 | 12/1962 | Campbell | 5—118 |
| 3,141,178 | 7/1964 | Campbell | 5—118 |

FOREIGN PATENTS 939,553   2/1956   Germany.

BENJAMIN HERSH, *Primary Examiner.*

E. E. PORTER, J. A. PEKAR, *Assistant Examiners.*